United States Patent [19]

Da Silva Passos

[11] 4,002,010
[45] Jan. 11, 1977

[54] HARVESTER FOR RICE, WHEAT AND SIMILAR CEREALS

[76] Inventor: Domicano Da Silva Passos, 440 Durval Clemente St., Sao Paulo, Brazil

[22] Filed: Apr. 23, 1975

[21] Appl. No.: 570,586

[30] Foreign Application Priority Data

Apr. 23, 1974 Brazil .................................. 03363

[52] U.S. Cl. .................................... 56/126; 56/33
[51] Int. Cl.² ........................................ A01D 41/08
[58] Field of Search .......................... 56/126–130, 56/33, 34, 35

[56] References Cited

UNITED STATES PATENTS

| | | | |
|---|---|---|---|
| 1,069,997 | 8/1913 | Appleby | 56/33 |
| 2,825,195 | 3/1958 | Smith | 56/33 X |
| 2,903,835 | 9/1959 | Kappelmann | 56/33 |
| 3,426,517 | 2/1969 | Duncan, Sr. | 56/330 |
| 3,439,482 | 4/1969 | Orton | 56/330 |
| 3,611,689 | 10/1971 | Patzlaff | 56/330 |
| 3,892,061 | 7/1975 | Whitley | 56/27.5 |

*Primary Examiner*—Russell R. Kinsey
*Attorney, Agent, or Firm*—Karl F. Ross; Herbert Dubno

[57] ABSTRACT

A harvester-thresher has a frame adapted to be pulled along the ground and formed with a forwardly-opening slot which is flanked by a pair of flailing elements that are displaced back and forth relative to this slot without cutting or pulling up this crop in order to thresh grain or the like from a crop passing upwardly through the slot. The flailing elements can be a pair of vibratorily reciprocal elements operated by a crank arrangement. It is also possible to use a pair of rotatable supports which each carry a pair of polygonal-section rollers that are orbited next to the slot and are themselves rotated about their own axes to flail the grain off the crops. The two assemblies are interconnected by a pair of gears and the individual rollers are themselves rotated by means of a V-belt or an internal gear connected to the ends of these rollers.

10 Claims, 7 Drawing Figures

HARVESTER FOR RICE, WHEAT AND SIMILAR CEREALS

FIELD OF THE INVENTION

The present invention relates to a harvesting apparatus. More particularly this invention concerns a thresher for a grain-carrying standing crop.

BACKGROUND OF THE INVENTION

Conventional harvesting-threshers of rice, wheat, and similar cereals are known which merely strip the grain from the stalk, without cutting or uprooting the stalk. Such devices are almost invariably of very large size so that they are extremely expensive and require highly skilled personnel both to operate and maintain them.

For this reason only large farming operations can afford their own threshers. The equipment must be rented for the automated harvesting of small farms, or a group of small farmers may combine to purchase a single such harvester that is then used by all of them cooperatively. Neither of these solutions is altogether satisfactory. During harvest time several farmers will need the device simultaneously, requiring at least some of them to harvest at times which are not ideal. Futhermore should the harvester break down it is possible crops will go unharvested, as more than one farmer depends on the functioning of this single piece of equipment.

OBJECTS OF THE INVENTION

It is therefore an object of the present invention to provide an improved harvester.

Another object of this invention is the provision of such a harvester which can be produced inexpensively enough to put it within the economic reach of the small farmer and which is so designed that servicing the device can be carried out by the farmer-owner.

Another object is the provision of a threshing machine which simply removes the grain from a standing crop such as corn, wheat, rice or the like, without cutting, reaping or pulling up the plant.

SUMMARY OF THE INVENTION

These objects are attained according to the present invention in an apparatus having a frame adapted to be displaced along the ground in a horizontal transport direction and formed with a forwardly open slot. A pair of flailing elements are provided on the frame to either side of the slot and drive means on the frame displaces these elements horizontally back and forth relative to the slot for threshing grain from crop projecting upwardly through the slot. A collector is provided on the frame and has at least one belt which catches the grain threshed from the crop and carries it to a hopper or the like.

In accordance with the present invention the apparatus frame is made of sheet metal and is adapted to be pulled along the ground behind a conventional farm tractor. The drive means is connected to the power takeoff of this tractor. Thus the entire assembly is attached to the tractor and powered thereby.

According to another feature of this invention the drive means includes a rotatable disk carried on the frame, an eccentric pin on the disk, and a link connecting this pin to the flailing element. Thus rotation of this disk slides the elements on the frame transversely to the slot.

In accordance with another feature of this invention, the drive means includes a pair of support rods pivotal about respective axes parallel to and flanking the slot. Each of these support rods carries at least one such flailing element in the form of an elongated polygonal-section roller which is orbited in rotation of the respective support about the axis of this support. This drive means is further provided with means for rotating the flail elements about their own longitudinal axes as these flail elements are orbited about their support axes. This is effected according to the present invention either by providing a gear on the support which meshes with a pinion carried on the flailing element, or pulleys on the ends of the flailing elements are interconnected by a belt.

In accordance with the present invention two such flailing elements are provided on each of the supports and are rotated at an angular velocity which is considerably greater than the angular velocity with which the support itself is rotated. The supports are each provided with a respective gear wheel which meshes with the gear wheel of the other support so that the two rotate in opposite directions. In this manner an extremely effective flailing of the crop is obtained so as to thresh all of the grain therefrom.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
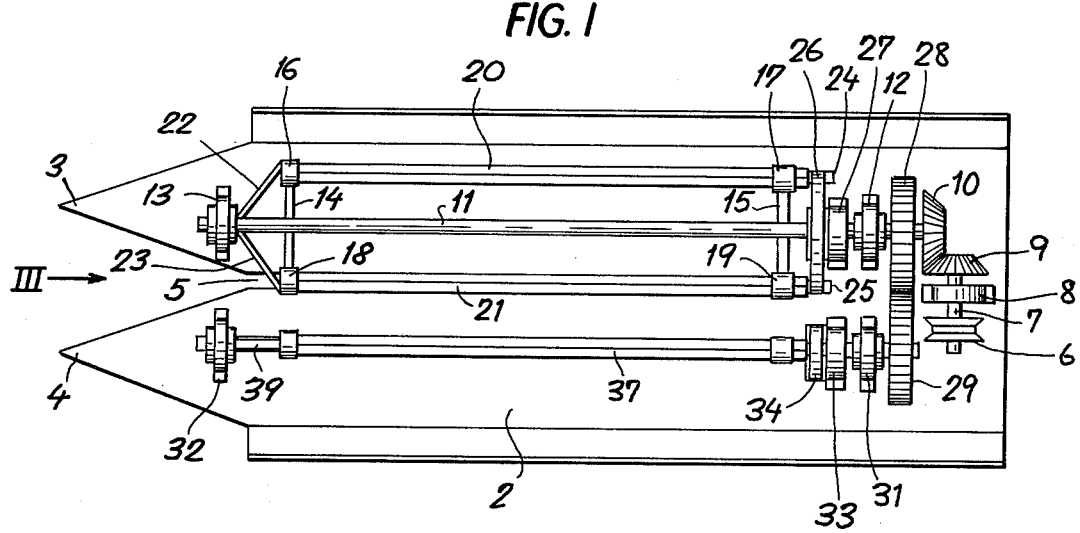
FIG. 1 is a top view of the apparatus according to this invention.
Figure 2:
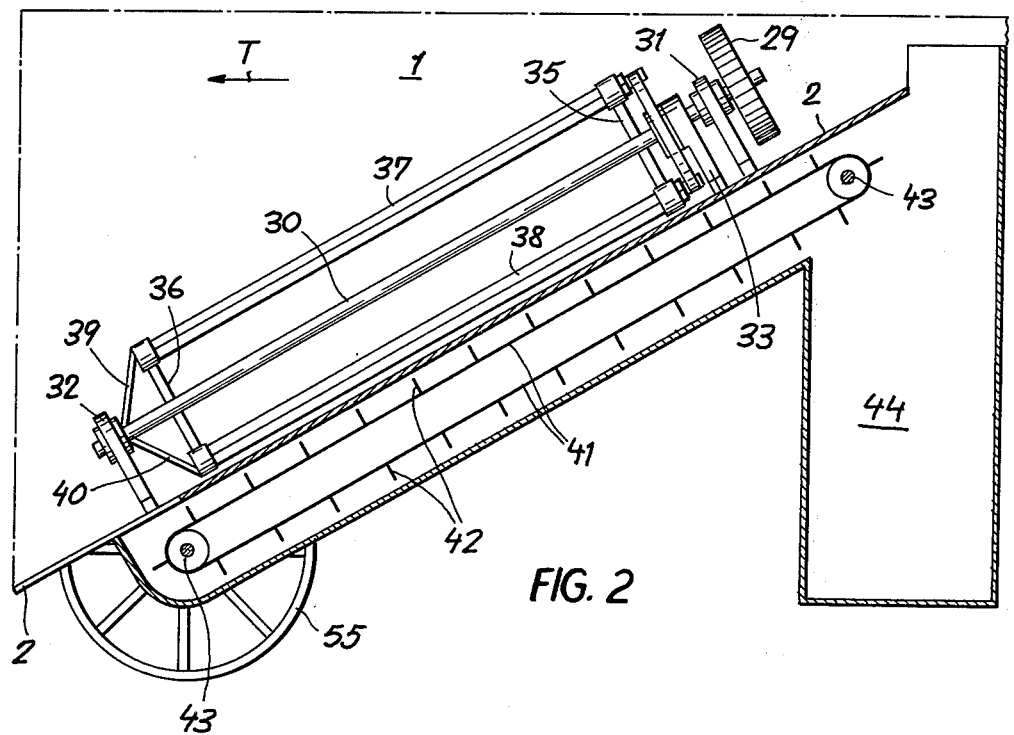
FIG. 2 is a side view of the apparatus of FIG. 1.
Figure 3:
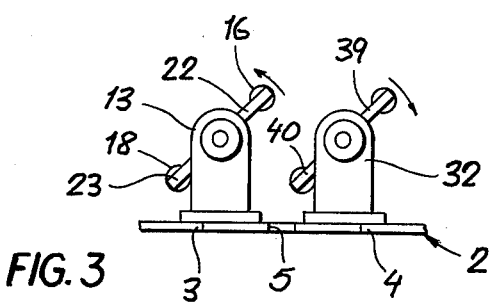
FIG. 3 is a view taken in the direction of arrow III of FIG. 1.

As shown in FIGS. 1–3 the apparatus of the present invention has a frame 1 on which is rigidly fixed a platform 2 extending at an angle of approximately 45° to a horizontal transport direction T. At its lower front end the platform 2 has a pair of triangular points 3 and 4 that define a slot 5 extending in the direction T, which is the direction in which the apparatus is pulled by a prime mover such as a farm tractor. A pulley 6 on the apparatus is connected to the power takeoff of the tractor and is carried on a shaft 7 rotatable in a journal 8 on the platform 2 and carrying at its opposite end a bevel gear 9 meshing with another bevel gear 10 carried on the rear end of a support rod or shaft 11. A pair of bearings 12 and 13 support the shaft 11 for rotation about its longitudinal axis which lies in a vertical plane parallel to the direction T. In back of the forward journal 13 is a support spider 14 carried on the shaft 11 and slightly forward of the rear journal 12 is another such two-arm support spider 15. The front support spider 14 has in its outer ends bearings 16 and 18 and the rear support 15 has bearings 17 and 19.

Rotatable in the bearings 16 and 17 is a roller 20 of square section and a similar roller 21 is rotatably mounted in the bearings 18 and 19. The axes of both these rollers 20 and 21 are parallel to the central support 11 and on rotation of this support 11 define a cylindrical orbit that crosses over the slot 5 as indicated in FIG. 3. The rollers 20 and 21 have at their rear ends small V-belt pulleys 24 and 25 which are interconnected by a V-belt 26 also spanned over a fixed support 27 so that as the rod 11 is rotated in one angular sense to orbit the rods 20 and 21 in that sense these rollers 20 and 21 will automatically be rotated about their own axes in the opposite angular sense.

In addition the rod 11 carries at its rear end between the journal 12 and bevel gear 10 a large-diameter gear wheel 28 meshing with another such gear wheel 29 carried on a shaft 30 itself carried on the frame 2 in a pair of journals 31 and 32. Two rollers 37 and 38 similar to the rollers 20 and 21 are carried on this rod 30 by means of a pair of support frames 35 and 36. A V-belt 34 connects the ends of these rollers 37 and 38 to a fixed V-belt pulley 33. The plane defined by the axes of the elongate elements 30, 37, and 38 is perpendicular to the plane defined by the elements 11, 20, and 21, and, since the two central rods 11 and 30 are interconnected rigidly by the gears 28 and 29, angular offset will be maintained.

In order to prevent the crop in the slot 5 from catching in the ends of the two flailing arrangements, stiffening and protecting bars 22 and 23 extend between the bearings 16 and 18 and the shaft 11 and similar such elements 39 and 40 are provided from the frame 36 at the front end of the assembly.

Under the slot 5 there is provided a belt 31 carried on rollers 43 and provided with upstanding flanges 42 so that grain flailed from the crop in the slot 5 falls onto these belts 41 and is carried backwardly onto a hopper 44 of the apparatus. Wheels 55 at the front end of the apparatus allow it to roll along the ground.

Figure 5:
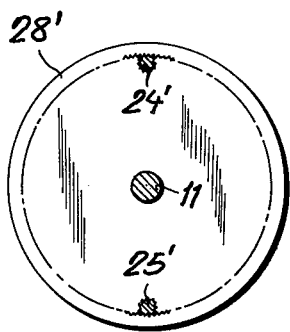
FIG. 5 is an end view of the system of FIG. 4.
Figure 4:
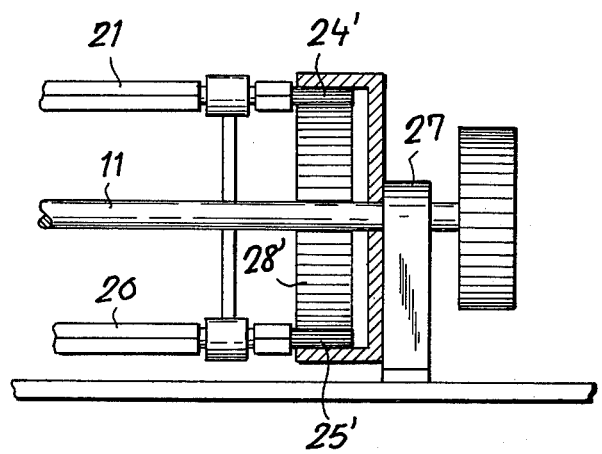
FIG. 4 is a partly sectional side view of a rotating arrangement for the apparatus of FIG. 1.

It is also possible as shown in FIG. 5 to provide an internal gear 28' secured to the element 27 and provide pinions 24' and 25' on the rod 20 and 21 that mesh internally with this gear 28'. In this manner as the shaft 11 rotates the square-section rollers 20 and 21 are similarly rotated about their own axes.

Figure 7:
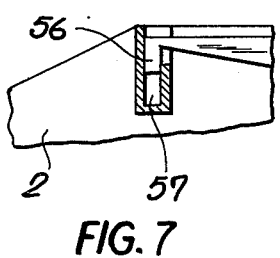
FIG. 7 is a partly sectional large-scale view of a detail of FIG. 6.
Figure 6:
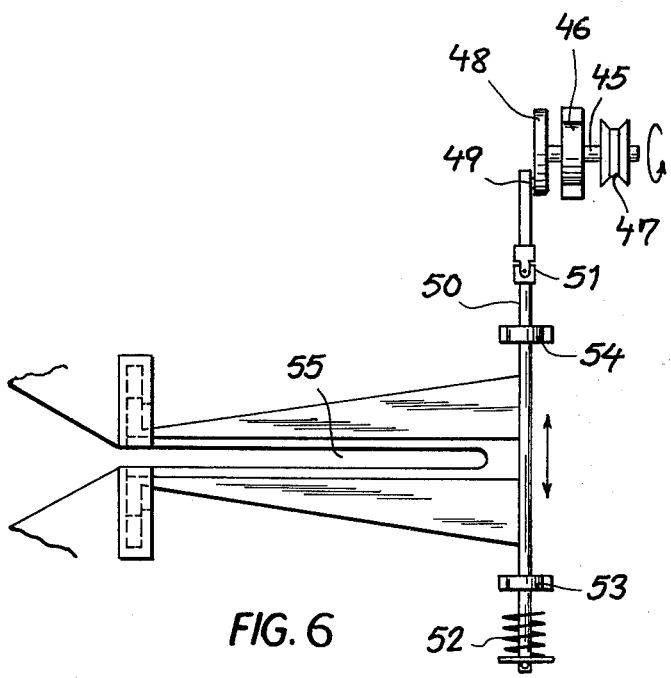
FIG. 6 is a top view of another reciprocating system according to the present invention.

FIGS. 6 and 7 show another arrangement wherein a pair of flailing elements 55 are carried on a rod 50 slidable in flanges 53 and 54 on the platform 2. A universal joint 51 connects a link 56 between this rod 50 and an eccentric pin 49 on a disk 48 itself carried on a shaft 45 journaled on a platform 2 in a mounting block 46. A pulley 47 on this shaft 45 is rotatable to reciprocate two elements 55 back and forth on the frame 2 next to the slot 5. At their front ends the triangular-shaped elements 55 are provided with short ears 56 received in guide slots 57 on the frame 2 which spacedly receive these ears 56 and allow lateral reciprocation of the elements 55. Spring 52 on the shaft cushions the reciprocation thereof.

I claim:

1. A harvesting machine for a grain-carrying standing crop, said machine comprising:
   a frame adapted to be displaced along the ground in a horizontal transport direction and formed with an upwardly and rearwardly inclined platform with a forwardly opening slot;
   a pair of flailing elements on said frame to either side of said slot;
   drive means on said frame for displacing said elements horizontally back and forth relative to said slot for threshing grain from crop projecting upwardly through said slot;
   an upwardly and rearwardly extending collector conveyor on said frame including at least one belt on said frame below said slot for catching grain threshed from said crop; and
   a cropper for said grain below said platform at the rear thereof for receiving grain from said conveyor.

2. The machine defined in claim 1 wherein said drive means includes a rotatable disk carried on said frame, an eccentric pin on said disk, and a link connecting said pin to said disk, and a link connecting said pin to said flailing elements, said elements being slidable on said frame transversely to said slot whereby rotation of said disk reciprocates said elements on said frame.

3. The machine defined in claim 2 wherein said flailing elements are parallel to and flank said slot, said drive means including guides at the front end of said elements for displacement of said front ends orthogonally to said slot.

4. The machine defined in claim 1 wherein said drive means includes a pair of supports pivotal about respective axes parallel to and flanking said slot, said elements each being at least one elongated roller carried on a respective support and orbital about and parallel to a respective axis.

5. The machine defined in claim 4 wherein said drive means includes means for rotating said elements about their own axes as said elements orbit about the support axis.

6. The machine defined in claim 4 wherein said means for rotating includes a pair of belts each spanned over a respective roller and a respective support.

7. The machine defined in claim 4 wherein said means for rotating includes a pinion carried on each roller and a gear carried on the respective support and meshing with the respective pinion.

8. The machine defined in claim 7 wherein said gear is an internal gear.

9. The machine defined in claim 4 wherein each support is a rod and carries a pair of such flailing elements parallel to and diametrically opposed across the respective axis.

10. The machine defined in claim 9 wherein said drive means includes a pair of meshing gear wheels each carried on a respective support.

* * * * *